3,079,313
SONOCHEMICAL PROCESSES FOR THE PREPARATION OF 6-AMINOPENICILLANIC ACID DERIVATIVES
John R. E. Hoover, Glenside, Pa., assignor to Smith Kline & French Laboratories, Philadelphia, Pa., a corporation of Pennsylvania
No Drawing. Filed May 7, 1962, Ser. No. 193,000
4 Claims. (Cl. 204—154)

This application is a continuation-in-part of my co-pending application Serial No. 41,727, filed July 11, 1960, now abandoned.

The invention described herein relates to novel processes for the preparation of valuable therapeutic agents. More particularly this invention pertains to the use of sonochemical techniques for preparing various synthetic derivatives, both known and novel, of the amphoteric antibiotic nucleus, 6-aminopenicillanic acid.

With the recent discovery of the basic nucleus of penicillin, namely 6-aminopenicillanic acid (hereafter abbreviated as "6-APA"), it has become possible to prepare a vast number of heretofore unknown compounds, many of which not only possess the valuable antimicrobial properties of parent penicillins against micro-organisms such as *Diplococcus pneumonia* and *Micrococcus pyogenes* and others, but in addition, demonstrate improved physical and physiological properties. While many of such novel classes of compounds have already been discovered, it is apparent that the boundaries of this new field have not in any way been approached, and it is to be expected that many more such derivatives will become known in the future.

While the art of preparing derivatives of 6-APA, by purely chemical means is thus still in its infancy, nevertheless it has become apparent that certain obstacles exist in this art and that these obstacles can be traced back to the inherent chemical nature of 6-APA. For example, the possible reactions which may be executed upon 6-APA are restricted to some degree by the chemically sensitive lactam structure of this compound. Similarly, while there exists a wide variety of reagents which are suitable for modifying the various groups of 6-APA, many of these can not be employed advantageously in solvents most compatible with 6-APA With particular regard to this latter difficulty, it is presumably because of 6-APA's amphoteric properties that this compound is best employed in aqueous media. At any pH other than that of 6-APA's isoelectric point, the solubility of 6-APA in non-aqueous media is so low that the feasibility of substantial reaction in such solvents is considerably diminished. As is known to the art, the solubility in organic solvents of such Zwitterions can be increased by forming an appropriate salt and thereby reducing its amphoteric properties. In the case of 6-aminopenicillanic acid, such a salt as the triethylamine salt will indeed increase its solubility in its non-aqueous solvents. However there then arises the additional necessity of preparing these derivatives and when not desired, this formation often involves as tedious a preparation as the actual formation of the desired 6-APA derivative. Furthermore, while various salts may have increased solubilities in non-aqueous solvents as compared with the free 6-APA, nevertheless the inherent ionic nature of the salt still restricts the compound from obtaining its optimum solubility in these non-aqueous solvents. Non-ionic derivatives such as esters of 6-APA while overcoming this latter difficulty, nevertheless only present the additional difficulties of formation of such a group prior to and removal subsequent to execution of the main reaction.

I have discovered that it is possible to employ 6-APA as the free acid in non-aqueous solvents, and to effect a rapid formation of the desired derivative by subjecting the reaction mixture to vibrations of ultrasonic frequency. Under such conditions it is possible to form derivatives of 6-APA in high yields and with a considerable diminution of reaction time. It is thus possible by virtue of my invention to react with 6-APA, reagents not suitable for aqueous media. These reactions heretofore have necessitated prior formation of a non-amphoteric 6-APA derivative, prolonged reaction period or both.

It appears that the advantageous effects of ultrasonic vibrations on the formation of 6-APA derivatives can be traced to at least two effects. One factor apparently involves the decrease of particle size of 6-APA aggregations upon subjection to ultrasonic vibrations. However unlike previous methods, a stable suspension or a homogeneous solution of 6-APA is not required to allow substantially complete reactions to be obtained. While a homogeneous solution is obtained, it is a solution of the final product and not of an intermediate 6-APA derivative. Thus it appears that ultrasonic vibrations in the type of reactions herein described, also cause an increase in the rate of reaction.

It is thus not necessary according to my invention to form intermediates of 6-APA solely to increase solubility in non-aqueous media. In certain instances, however, it is profitable to isolate the final product as such a derivative and to consequently employ the starting material 6-APA in the form of this derivative. In this aspect also, application of ultrasonic vibrations result in a decrease in reaction time required for the formation of the 6-APA intermediate. Thus, for example, in those instances where it is desirable in the main reaction to employ the triethylamine salt of 6-APA, the complete formation of this salt is accomplished in a fraction of the time required when no ultrasonic vibrations are employed. In addition, it is often desirable to prepare such salts or other derivatives under non-aqueous conditions so that the resultant product can be directly treated with reagents incompatible with aqueous media without the necessity of drying the product prior to such treatment.

According to my invention, 6-aminopenicillanic acid is combined with the desired reagent reactable with said nucleus in a nonaqueous inert polar solvent and subjected to ultrasonic vibrations of the frequency herein set forth.

Exemplary of such non-aqueous inert polar solvents are those organic solvents having a dipole moment at least in the magnitude of approximately 2–3 Debye units or greater, such as for example, dimethylformamide, acetonitrile, dimethylacetamide, nitrobenzene, acetone, dichloroethane, o-nitroanisole and the like.

Representative of those reagents which are unsuitable for use in aqueous solvents and for which my process is highly advantageous, are those amine-reactive agents, including acyl halides such as phenylacetyl chloride, acetyl chloride, propionyl chloride, and the like; isocyanates such as methylisocyanate, ethylisocyanate, benzylisocyanate and the like; acid anhydrides such as acetic anhydride, propionic anhydride and the like; isothiocyanates such as methylisothiocyanate, benzylisothiocyanate and the like.

Also included within the scope of the reagents are those basic reagents employed for the formation of acid derivatives, such as for example, benzyl chloride, alkali metal alkoxides, dehydrating agents for the formation of anhydrides and the like.

Generally according to my invention, the reaction mixture is subjected to ultrasonic vibrations for a period from about 30 minutes to about 4 hours, at which point substantial homogeneity is obtained and the reaction is virtually complete. While there may be a slight rise in the temperature during the reaction, it is not appreciable and it is presumably due to the cavitation effect.

By the term "ultrasonics" I refer to vibrations of a frequency generally in the range between 35,000 and 90,000 cycles per second and advantageously in the order of 35,000 to 60,000 cycles per second. Such vibrations may be obtained by any of the known methods or devices for producing ulitrasonics of this frequency, as for example, by magnetostrictive or piezoelectric transducers.

It would be expected from the uses of ultrasonics heretofore reported that the complex molecular structure of this amphoteric antibiotic nucleus would be considerably altered if not drastically decomposed by the use of ultrasonic vibrations. Quite to the contrary, I have discovered that no decomposition or molecular alterations (aside from the desired transformation) occur as the result of my process. Furthermore, the reduced reaction time resulting from my process minimizes decompositions by other factors such as external heat or side reactions.

The following examples will serve to further typify the method of my invention but should not be construed as limiting the scope thereof, the scope being defined only by the appended claims.

*Example 1*

To a mixture of 7.2 ml. of phenylisothiocyanate and 100 ml. of dimethylformamide are added 8.64 g. of 6-aminopenicillanic acid. The mixture is then subjected to ultrasonic vibrations at a frequency of 35,000 cycles per second at room temperature for a period of 4 hours. At the end of this time, the small amount of remaining solid is removed by filtration and the solution is cooled. There is then added 30 ml. of triethylamine and to the cooled mixture is next added ether until crystallization occurs. The solid is collected and recrystallized from dimethylformamide in ether to yield 6-(N-phenylthioureido)-penicillanic acid as the triethylamine salt, M.P. 144–145° C. (dec.).

*Example 2*

6-aminopenicillanic acid (4.32 g.) is added to a mixture of 3.2 ml. of phenylisocyanate and 50 ml. of dimethylformamide. The mixture is subjected to ultrasonic vibrations at a frequency of 40,000 cycles per second for 1½ hours. The solution is filtered, dried, reduced to a residue and to it is added a solution of potassium-α-ethylhexanoate in isopropanol until crystals appear. The solid is collected by filtration, washed with a small amount of acetone and recrystallized from dimethylformamide to yield 6-(N-phenylureido)-penicillanic acid as the potassium salt.

*Example 3*

To 50 ml. of acetonitrile is added 4.3 g. of 6-aminopenicillanic acid and 3 g. of triethylamine. The mixture is subjected to ultrasonic vibrations at a frequency of 38,000 cycles per second for 1½ hours at room temperature. The resulting liquid is filtered to yield a homogeneous solution of 6-aminopenicillanic acid as the triethylamine salt. In a similar fashion, dimethylformamide or other non-aqueous polar solvents may be employed in the place of acetonitrile.

This substantially non-aqueous solution is then suitable for use in various reagents in which non-aqueous conditions are desired.

*Example 4*

To 50 ml. of a solution of 6-aminopenicillanic acid as the trimethylamine salt in acetonitrile (prepared as in Example 3) are added 5.4 g. of 2-phenylcyclopropane-carboxyl chloride. The mixture is stirred for 3 hours. At the end of this time the solution is cooled and ether is added until precipitation occurs. The solid is collected by filtration and recrystallized from dimethylformamide to yield 6-(2-phenylcyclopropanecarboxyamido)-penicillanic acid.

*Example 5*

To 50 ml. of a solution of 6-aminopenicillanic acid as the triethylamine salt is dimethylformamide (prepared as in Example 3) are added 6.7 g. of phenylacetic anhydride. The solution is stirred at room temperature for 3 hours and at the end of this time, ether is added and cooled until crytallization occurs. The solid is collected by filtration and recrystallized from dimethylformamide to yield 6-(benzylcarboxyamido)-penicillanic acid (penicillin G) as the triethylamine salt.

*Example 6*

There are added to 50 ml. of nitrobenzene, 4.32 g. of 6-aminopenicillanic acid and 5.1 g. of phenoxyacetylchloride. The mixture is subjected to ultrasonic vibrations of a frequency of 50,000 cycles per second for 2 hours at room temperature. To the mixture is then added sufficient sodium hexanoate to effect precipitation and the solid which thus forms is collected by filtration. This solid is dissolved in water and the aqueous solution adjusted to pH 2 by the addition of hydrochloric acid. The solid formed is collected, washed with a small amount of water and dried to yield 6-(phenoxycarboxyamido)-penicillanic acid (penicillin V).

*Example 7*

6-aminopenicillanic acid (4.3 g.) and α-phenoxypropionic anhydride (10.7 g.) are combined in 75 ml. of dichloroethane. The mixture is then subjected to ultrasonic vibrations at a frequency of 75,000 cycles per second for 4 hours at room temperature and the resultant product, 6-(α-phenoxyethylcarboxyamido)-penicillanic acid (phenethicillin) as the triethylamine salt is collected in the manner of Example 1.

What is claimed is:

1. In the process for the chemical modification of at least one amphoteric group of 6-aminopenicillanic acid under substantially non-aqueous conditions, the step which comprises subjecting a mixture of 6-aminopenicillanic acid and the reagent for said modification in a substantially non-aqueous, inert, polar, organic solvent to ultrasonic vibrations of a frequency in the range of from about 35,000 cycles per second to about 90,000 cycles per second.

2. The process according to claim 1 wherein said non-aqueous, inert, polar, organic solvent has a dipole moment at least as great as about 2 Debye units.

3. The process according to claim 1 wherein the non-aqueous, inert, polar, organic solvent is selected from the group consisting of acetonitrile, dimethylformamide, nitrobenzene, acetone, dichloroethane and o-nitroanisole.

4. The process according to claim 1 wherein the ultrasonic vibrations are of a frequency from about 35,000 cycles per second to about 60,000 cycles per second.

References Cited in the file of this patent

UNITED STATES PATENTS 2,941,995     Doyle et al.   ---------- June 21, 1960
2,951,839     Doyle et al.   ---------- Sept. 6, 1960

OTHER REFERENCES

Richards et al.: Journal American Chemical Society, vol. 49 (1927), pp. 3086–3100.

Campbell et al.: The Pharmaceutical Journal, August 13, 1949, pp. 127–128.